(12) United States Patent
Lind

(10) Patent No.: US 7,171,344 B2
(45) Date of Patent: Jan. 30, 2007

(54) METHOD AND SYSTEM FOR PROVIDING END-USER VISUALIZATION

(75) Inventor: Jeffrey D. Lind, Apex, NC (US)

(73) Assignee: Caterpillar Inc, Peoria, IL (US)

( * ) Notice: Subject to any disclaimer, the term of this patent is extended or adjusted under 35 U.S.C. 154(b) by 870 days.

(21) Appl. No.: 10/024,267

(22) Filed: Dec. 21, 2001

(65) Prior Publication Data

US 2003/0120472 A1 Jun. 26, 2003

(51) Int. Cl.
*G06G 7/48* (2006.01)
(52) U.S. Cl. .............................. 703/6; 703/13; 700/98
(58) Field of Classification Search ................ 700/98
See application file for complete search history.

(56) References Cited

U.S. PATENT DOCUMENTS

2002/0007294 A1* 1/2002 Bradbury et al. .............. 705/7
2002/0123812 A1* 9/2002 Jayaram et al. ............... 700/98

OTHER PUBLICATIONS

"The Best of Both Worlds", Mixed Reality, Exploring the E-World, Hightech Report, 2001, pp. 100-103.
CIMdata, Inc., "cPDm, The Key to Harnessing Innovation in an E-Business World", http://www.cimdata.com/cPDm_Main.htm, Nov. 2, 2001, pp. 1-3.
"Augmented Reality", http://lcs.www.media.mit.edu/projects/wearables/augmented-reality.html, Nov. 2, 2001, pp. 1-5.
Clifford/Elliot Ltd., Advanced Manufacturing Magazine, Industrialsourcebook.com, http://www.advancedmanufacturing.com/July01/worldwatch.htm, 2001 World Watch, Jul. 1, 2001; pp. 1-8.
MacKrell, John, "Cimmetry's AutoVue Enables Visualization and Collaboration", Visualizing Product Information, CIMdata, Inc., Apr. 2001, pp. 1-14.
Abed, Wadab, News Release, "CIMdata 2001 Conference Focuses on Collaborative Engineering through the Supply Chain", CIMdata, Apr. 30, 2001, pp. 1-5.

* cited by examiner

*Primary Examiner*—Hugh Jones
*Assistant Examiner*—Saif Alhija
(74) *Attorney, Agent, or Firm*—Finnegan, Henderson, Farabow, Garrett & Dunner

(57) ABSTRACT

A process for simulating one or more components for a user is disclosed. The process may include creating an engineering model of a component, receiving selection data for configuring the component from a user, and creating a web-based model of the component based on the selection data and the engineering model. Further, the process may include performing a simulation of the web-based model in a simulation environment and providing, to the user, feedback data reflecting characteristics of the web-based model during the simulation.

10 Claims, 13 Drawing Sheets

METHOD AND SYSTEM FOR PROVIDING END-USER VISUALIZATION

TECHNICAL FIELD

This invention relates generally to visualization computing systems, and more particularly to systems and methods for providing an end user with customized component visualization in a distributed computing environment.

BACKGROUND

The complexity of products has continued to grow as new technologies and industries are born. Due to this growth, businesses have increased the use of Computer-Aided Design (CAD) and visualization tools to design, develop, and manufacture these products. These tools allow a user to not only design a component, but also display and interact with an image of the component. The dynamic and interactive nature of these tools provide immediate visual feedback to the user regarding attributes of the component as its design is altered.

Because design and manufacture businesses alike have recognized the benefits of CAD and visualization, they are becoming standard tools used during product development. Additionally, these businesses have expanded the capabilities of such tools by implementing Product Data Management (PDM) technologies. PDM is aimed at collaborating engineering data associated with a designed product within a dispersed business organization. Adopting the use of the Internet, web-based visualization tools, and PDM enables a business to share product development data among teams of people distributed across several remote organizations. This combination, known as "collaborative Product Definition management" (cPDm), enables a business to take advantage of growing e-commerce technologies to manage the development of components across a distributed organization from design to production.

An overview of visualization techniques and cPDm methodologies is disclosed in "Visualizing Product Information," April 2001, by John MacKrell. This reference describes the advantages and capabilities of combined visualization and PDM technologies for businesses. For instance, MacKrell discloses the ability for visualization systems to allow a business entity to markup and interact with a visual design that has been lightened from a Computer-Aided Design (CAD) format to a less complex web-based format. Further, the reference discusses how a visualization system should be able to provide various types of data formats of a designed component for different entities within a business organization. For example, a business' shop floor may require 2D and 3D visual and textual design data formats, while the front office of the same business may only require textual formats.

Although the benefits of visualization systems are typically exploited by the internal operations of a organization, the use of such technology for marketing purposes has not been explored. That is, the capabilities and advantages of these tools are generally restricted for internal use (i.e., employee designers) while external entities, such as an on-line user, are limited to standard display tools for viewing the products offered by a business. While some businesses offer web-based configuration tools that allow a user to access information on available products on-line, the information provided to the user may be restricted to textual information and limited image data, such as photographs. For example, typical web-based configuration tools may allow a user to configure a product based on limited options presented on a web site. The web site may present limited text-based drop down menus where the customer may select various options that may be associated with an available product, such as when a customer is configuring an automobile at a manufacturer's web site. In such an example, the customer may select among various option packages, models, and colors that are offered by the manufacturer. Once certain options are selected, the user may be presented with a fixed image of a base model automobile in the selected color. Further, the user may be presented with textual information describing limited operating characteristics associated with the configured automobile, such as fuel mileage, torque, horsepower, etc.

Although typical web-based end-user configuration tools provide some level of design configuration to a customer, the information provided is limited. In most instances, a visual presentation is limited to a two dimensional image of a configured product. One reason for the limitations of these configuration tools is the complexity associated with the interrelationship among components in a configured product. Configuring a product for an end user based on components selected by the user may require an enormous amount of text-based information to describe each component. Further, because each component of a product may be related to a plurality of other components, a selection of one component may require limitations in the selection of several other components. Therefore, the more optional components that a customer may select during an on-line configuration process increases the complexity of the information that must be processed. Accordingly, most end-user configuration tools do not provide users with all of the optional components that may be available for a product.

Conventional end-user configuration systems are not only limited in providing a customer with a versatile configuration process, they also lack the ability to update a web-based model for a product based on changes made in the engineering and/or design of the product. Accordingly, an end user may be provided with information for a product that does not include current changes to its design. This may result in lost customers for the product's manufacturer if the missing design change is located by the user on a competitor's product while visiting other web sites.

Methods, systems, and articles of manufacture consistent with certain features of the present invention are directed to solving one or more of the problems set forth above.

SUMMARY OF THE INVENTION

In an aspect of the present invention, a process is performed for simulating one or more components for a user. The process may include establishing an engineering model of a component, receiving selection data for configuring the component from a user, and establishing a web-based model of the component based on the selection data and the engineering model. Further, the process may include performing a simulation of the web-based model.

In another aspect of the invention, a system may simulate one or more components configured by a user. The system may include a client system operated by a user and a server system. The server system may include a process for receiving configuration data from the client system reflecting a configuration of a component selected by the user. Further, the server system may include a process for establishing a web-based model of the component based on the configuration data and an engineering model of the component.

In yet another aspect of the invention, a computer-readable medium including instructions for performing a process, when executed by a processor, for simulating one or more components is disclosed. The process may include establishing an engineering model of a component, receiving selection data for configuring the component from a user, and establishing a web-based model of the component based on the selection data and the engineering model. Further, the process may include performing a simulation of the web-based model.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Reference will now be made in detail to the exemplary aspects of the invention, which are illustrated in the accompanying drawings. Wherever possible, the same reference numbers will be used throughout the drawings to refer to the same or like parts.

Figure 1:
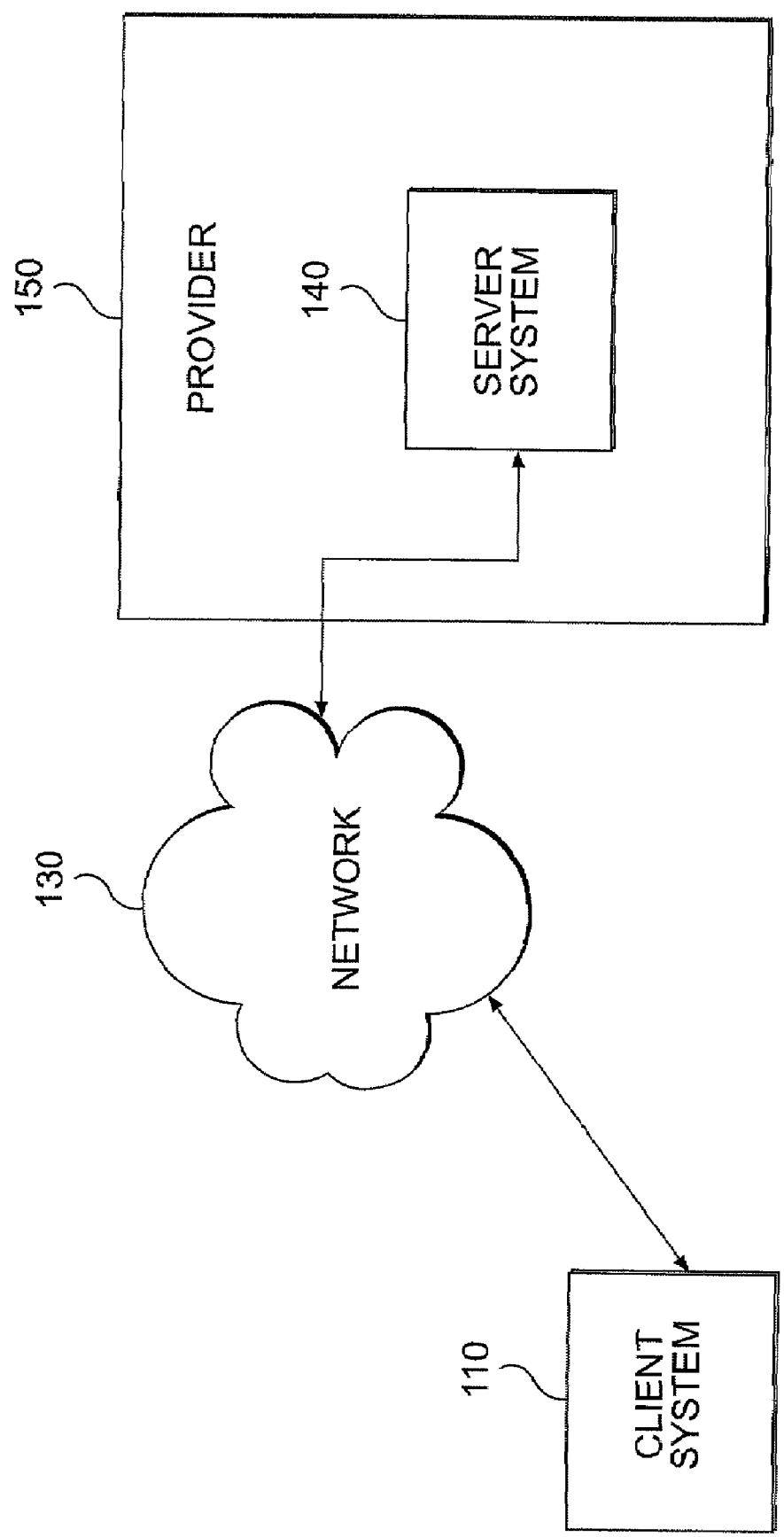
FIG. 1 illustrates an exemplary system environment in which methods, systems, and articles of manufacture, consistent with features and principles of the present invention may be implemented.

FIG. 1 illustrates an exemplary system environment in which features and principles consistent with the present invention may be implemented. As shown, the exemplary system environment may include a client system 110, network 130, server system 140, and provider 150. Although FIG. 1 shows only one client, server, and provider, one skilled in the art would realize that any number of these elements may be implemented within the computing environment shown in FIG. 1 without departing from the scope of the present invention.

Client system 110 may be a desktop computer, workstation, laptop, personal digital assistant, and any other similar computer system known in the art. For example, client 110 may include a processor, associated memory, and numerous other elements and functionalities available in computer systems. These elements may include input/output devices, such as a keyboard, mouse and display, although these input means may take other forms. Also, included in client 110 may be a network interface and a web browser application stored within a local memory for communicating with network 130. Client system 110 may also be associated with handheld and/or portable computing devices, such as the Palm Pilot from Palm™. In one aspect of the present invention, a user may operate client system 110 to perform functions consistent with certain features related to the present invention. A user may be any individual that interacts with server system 140 to perform functions consistent with the present invention. For instance, a user may be a consumer who is browsing a web site provided by server system 140. Furthermore, a user may be a customer who has purchased, is purchasing, or is attempting to purchase a component offered by provider 150.

Network 130 interconnects client system 110 and server system 140. Network 130 may include one or more communication networks, including the Internet or any other similar network that may support web-based processing. Further, network 130 may include wireline and/or wireless based networks.

Server system 140 may be a computer system that provides information to a requesting entity through network 130. Server system 140 may include a desktop computer, workstation, mainframe, or any other similar server system known in the art. Further, server system 140 may include and/or be connected to one or more memory devices, such as databases. In one configuration consistent with certain features of the present invention, server system 140 may be associated with provider 150 that provides and/or manufactures components.

A component may be an individual piece of equipment, such as, for example, a universal joint for a vehicle, a brake shoe, and a headlamp for a vehicle. Alternatively, a component may be a product or assembly that includes a combination of components, such as a backhoe loader, a household appliance, a bicycle, and any other type of product that may include a plurality of components. The level of granularity associated with the definition of a component is not restricted to the functional and/or physical characteristics of the component itself. For example, the universal joint indicated above may be considered a single component or a product including several components. One skilled in the art would realize that any type of equipment, product, and/or system may be associated with the term component without departing from the scope of the invention.

Provider 150 may be a business entity that designs, manufactures, offers, sells, leases, maintains, and/or develops one or more components, such as a dealer, retailer, maintenance provider, etc. Provider 150 may be a single business entity or may be a distributed entity that includes a plurality of entities remotely distributed, such as a world wide organization that include departments in different countries. One skilled in the art would realize that provider 150 may be any type of business entity associated with any type of business market, including, but not limited to, vehicles, mobile machines, toys, appliances, construction equipment, mining equipment, and merchandise (i.e., clothing, sports equipment, etc.).

In one aspect of the present invention, the system environment shown in FIG. 1 may further include a vendor system connected to network 130. A vendor system may be any type of computer system that provides web-based information, such as a web server. The vendor system may provide and manage one or more web sites that may be accessed by client system 110 through network 130. In one aspect of the invention, a vendor system may represent a web server associated with a vendor site that is a dealer or retailer of components provided by provider 150. One skilled in the art would realize that methods, systems, and articles of manufacture consistent with certain features of the present invention may be employed with or without a vendor system without departing from the scope of the invention.

Figure 2:
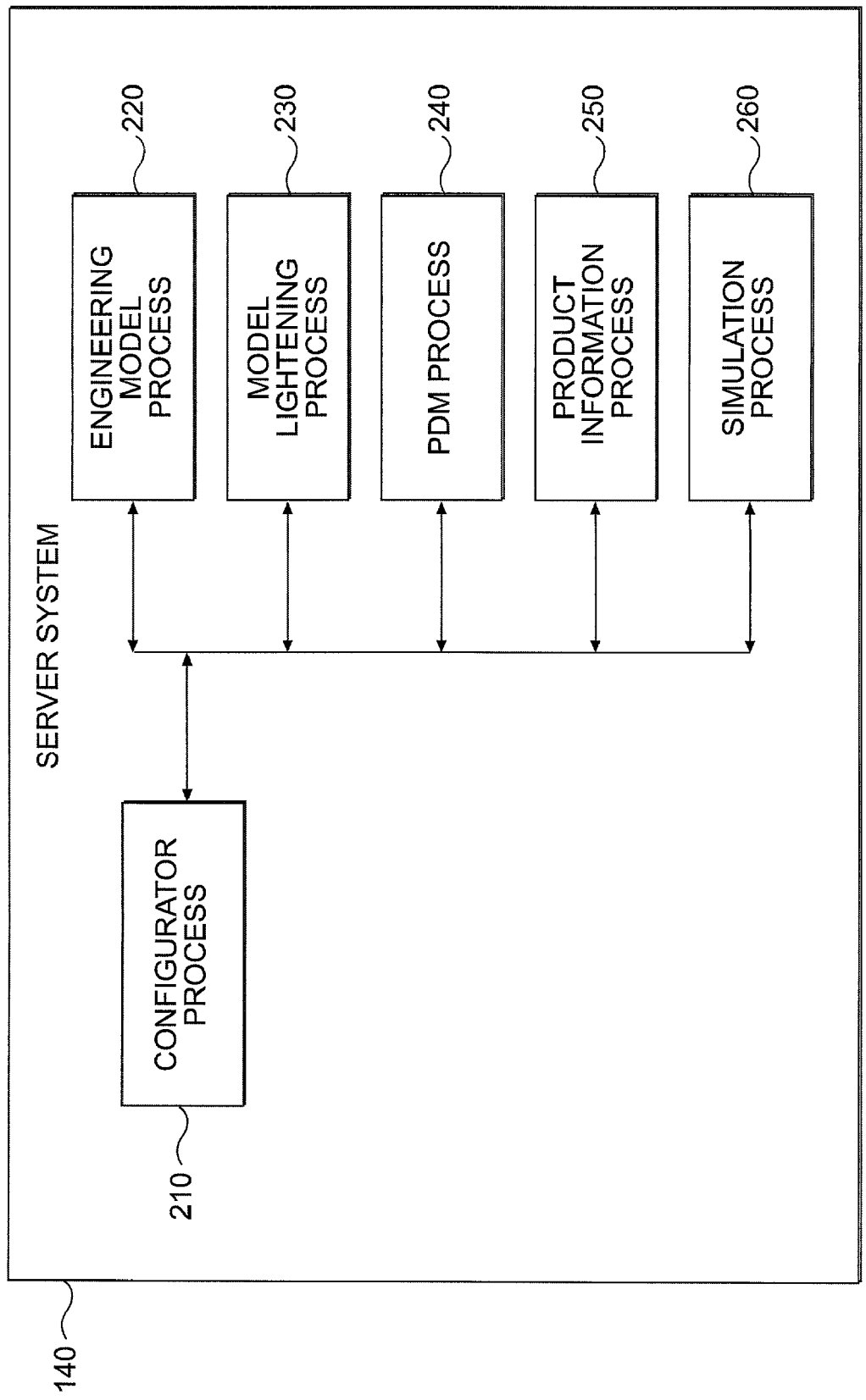
FIG. 2 illustrates a block diagram of an exemplary server system consistent with certain principles related to the present invention.

FIG. 2 illustrates an exemplary block diagram of server system 140 consistent with certain principles related to the present invention. As shown, server system 140 may include a configurator process 210, a engineering model process 220, a model lightening process 230, a Product Data Management (PDM) process 240, a product information process 250, and a simulation process 260. The processes included in server system 140 may be processes that are stored in one or more memory devices and executed by one or more processors running within server system 140. Alternatively, some or all of these processes may be sub-systems of server system 140 that include software, hardware, processing systems, memory, support systems, and any other elements that enable each sub-system to perform their respective functions consistent with features of the present invention. One skilled in the art would realize that the configuration of server system 140 as shown in FIG. 2 is exemplary and not intended to be limiting. A number of different processes and configurations may be added and/or removed from server system 140 without departing form the scope of the present invention. For example, one or all of process 210–260 may be located remotely from, and accessible by, server system 140.

Configurator process 210 may be a process that manages communication sessions with client system 110 and/or a vendor system (not shown). These communication sessions may include providing one or more web sites that client system 110 may access. In one configuration consistent with certain aspects of the present invention, configurator process 210 may include and/or communicate with a web server that provides a web site that is accessible by client system 110 and a vendor system. The web site may present components that are associated with provider 150. Further, configurator process 210 may include processes that allow a user to view images and text data associated with a component on the web site, receive selections for configuring the component including selections of optional sub-components associated with the component that may be presented on the web site, and perform simulation operations with the configured component in a manner consistent with certain features related to the present invention.

Engineering model process 220 may be a process and/or system that establishes engineering models for each component provided by provider 150 by accessing, creating and/or managing the models. An engineering model may be a model associated with a component that has been designed by one or more entities associated with provider 150, such as a single employee or group of employees who design and develop a component using CAD and visualization tools. In one embodiment, the engineering model may be associated with a heavy model. A heavy model includes detailed information regarding the engineering aspects of a component. The engineering model may consist of a visual model that may be in 2D and 3D, as well as textual information associated with the engineering specifications of the component. Further, an engineering model for a component may include information (i.e., data, software code, etc.) that may be used for manipulating the component visually on a display screen, such as rotating and moving the component.

In addition to information reflecting the physical characteristics of a component, each engineering model may also be associated with functional and/or marketing information associated with the component. That is, an engineering model for a component may include all types of information associated with the component offered by provider 150, including, but not limited to, functional characteristics (e.g., hydraulic systems characteristics, fuel system characteristics, Mean Time Between Failure (MTBF) data, stress thresholds, control and/or response characteristics) and cost information (e.g., manufacturing and retail costs of a component based on the type of characteristics of the component). One skilled in the art would realize that the information associated with each engineering model managed by engineering model process 220 may include additional (or less) types of information without departing from the scope of the invention.

Engineering model process 220 may store a model for each designed component in a memory device, such as a database (not shown). Each engineering model may be created using any known engineering modeling software and/or processes. In one configuration consistent with certain principles related to the present invention, engineering model process 220 may collect and group each engineering model in the memory device based on the characteristics of the model's respective component. Alternatively, engineering model process 220 may establish an engineering model by accessing an engineering model that was previously created and stored in a memory device.

Figure 3:
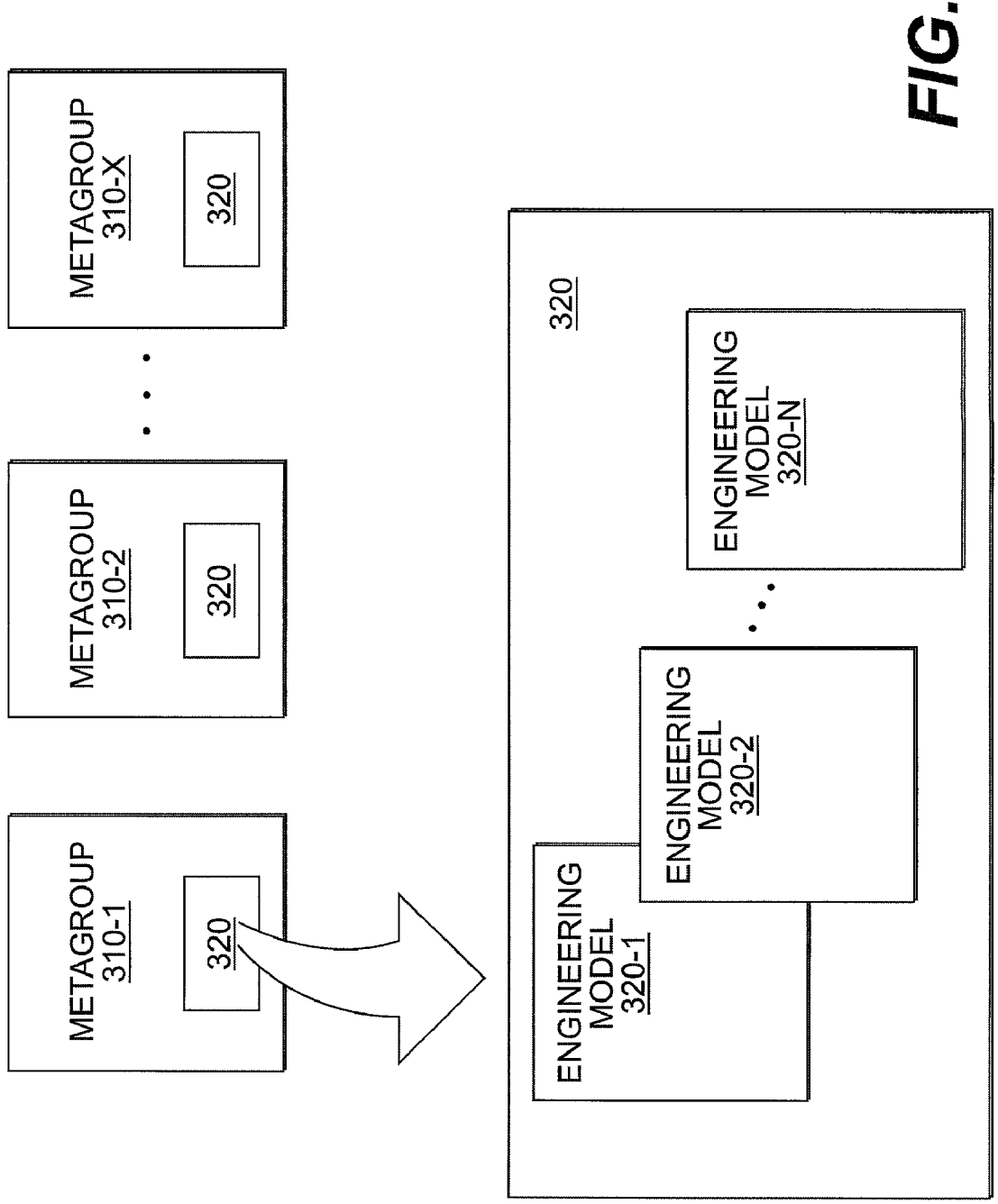
FIG. 3 illustrates an exemplary engineering model grouping scheme consistent with certain principles related to the present invention.

FIG. 3 shows an exemplary configuration scheme that engineering model process 220 may incorporate to group engineering models. As shown, engineering model process 220 may group engineering models into metagroups 310-1 to 310-X. Each metagroup may be associated with any type of characteristic associated with the designed components and their respective engineering models. For instance, each metagroup may be created based on a type of machine associated with a component. Accordingly, if provider 150 manufacturers and provides earth moving equipment, metagroup 310-1 may be associated with farm tractors, while metagroup 310-2 may be associated with backhoe loaders. Accordingly, any component (sub-component) associated with a farm tractor is included in metagroup 310-1 and any component (sub-component) associated with a backhoe loader is included in metagroup 310-2. One skilled in the art would realize that the metagroups may be separated based on a number of different criteria, such as cost, component dimensions, model year, work environment that a component may be used, and any other type of criteria, without departing from the scope of the invention. Alternatively, engineering model 220 may not group the engineering models by metagroups and may instead store them in the memory device using any other data arrangement configurations known in the art.

Additionally, as shown in FIG. 3, each metagroup 310-1 to 310-N may include one or more engineering models 320. For example, as shown in the figure, an engineering model 320 may include a plurality of engineering models 320-1 to 320-N, each reflecting a respective component included in metagroup 310-1. One skilled in the art would realize that one, some, or all of the metagroups 310-2 to 310-X may include a plurality of engineering models that may be equal to, or different than, the number of engineering models (320-1 to 320-N) associated with metagroup 310-1. As previously described, the engineering models 320-1 to 320-N may include engineering specification data, functional data, and marketing information associated with the component corresponding to the engineering model. In one aspect of the invention, each engineering model 320-1 to 320-N may also include relationship data associated with each sub-component included in a component. For example, engineering model 320-1 may be associated with a particular piece of equipment, such as a farm tractor. This exemplary model 320-1 may include a listing of every component included in the farm tractor. Additionally, each of the components included in exemplary engineering model 320-1 may be linked to another engineering model (not shown) that includes all of the engineering, functional, and marketing information associated with the respective component, including 3D image data. One skilled in the art would realize that engineering models 320-1 to 320-N may include a number of different types of data, including, but not limited to, textual, graphical, and audio data, without departing from the scope of the invention.

Referring back to FIG. 2, server system 140 may also include a model lightening process 230. This process may include one or more processes that create lightened models of an engineering model managed by engineering model process 220. For instance, each lightened model may be based on an engineering model that is reduced in weight by any percentage determined by server system 140, such as 50%, 90%, or 99%. Model lightening process 230 may reduce each engineering model by removing certain data that may not be needed for rendering a 3D image by configurator process 210. For example, model lightening process 210 may retain surface materials and realistic logos when reducing an engineering model, but may remove image and specification data associated with interior sub-components that may not be seen in real-life, such as the pistons of an engine within a vehicle. Model lightening process 230 may incorporate several known model lightening techniques to reduce the weight of an engineering model, including but not limited to, polygon reduction techniques. In one aspect consistent with features of the present invention, model lightening process 230 may reduce the weight of a heavy engineering model phases. That is, process 230 may reduce a heavy engineering model to a medium weight model in a first phase. The medium weight model may then be further reduced to a light weight model by process 230. One skilled in the art would realize that the number of phases model lightening process 230 may implement to reduce the weight of an engineering model may vary without departing from the scope of the present invention.

Reducing the weight of an engineering model reduces the memory size of the model. Model lightening process 230 may reduce the engineering models and store the reduced models as web-based models in a memory device, such as a database (not shown), that is accessible by configurator process 210. Because the web-based models have a reduced weight, they take up less memory and are capable of being processed, transferred, and rendered more quickly by configurator process 210 than engineering models. For instance, an engineering model may be one or more 100 Megabytes in size while its corresponding web-based model may be only 1 or 2 Megabytes. The reduced size of the web-based model may allow it to be provided in a web page displayed at client system 210 in such a manner that enables a user at client system 110 to manipulate the model in near real-time.

Product data manager 240 may be a process that that performs a consistency process of the web-based models created by model lightening process 230 and the engineering models managed by engineering model process 220. The consistency process may ensure that the design specifications reflected in an engineering model are the same in a corresponding web-based model. In one aspect of the invention, product data manager 240 may perform the consistency process automatically and periodically, such as every day, week, and month. Alternatively, the consistency process may be initiated manually by an individual associated with provider 150. Further, the consistency process may be initiated by configurator process 210 during a communication session with client system 110 and/or a vendor system. Additionally, product data manager 240 may also detect changes in the design of an engineering model and update a corresponding web-based model based on the design changes. That is, product data manager 240 may detect when a component has had a design change, via its engineering model, and direct model lightening process 230 to reduce the new engineering model and replace the original web-based model with the updated reduced web-based model for the redesigned component.

In one embodiment consistent with certain features of the present invention, modifications associated with the engineering models may not be updated immediately. For example, batch jobs may be executed by product data manager 240 to update lightened web-based models with changes associated with the engineering models. The batch jobs may be executed every night, once a week, or whenever the engineering models are changed. Although product data manager 240 may perform batch jobs over some defined interval of time, it may also be configured to update the web-based models based on a defined event, such as when configurator process 210 configures a component based on input received from a user.

Product information process 250 may be a process that manages product information associated with each engineering model managed by engineering model process 220. The product information may include information associated with each component that has been modeled, such as price, still image data, product description information, text-based articles associated with a component, voice and sound attachment files, hyperlinks to sources of information associated with the component, and any other type of information that may be associated with a component that has a corresponding engineering model managed by engineering model process 220. The product information may be collected and grouped in a memory device in a manner similar to that described with reference to the engineering models shown in FIG. 3. In one configuration consistent with certain features of the present invention, engineering model process may access the product information for each component and store it in a corresponding engineering model 320-1 to 320-N shown in FIG. 3.

In addition to verifying the consistency between an engineering model and a web-based model, product data manager 240 may also perform a consistency process that verifies information between the product information stored in the engineering models 320-1 to 320-N and the product information managed by product information process 250. Further, product data manager 240 may be configured to detect an inconsistency with product information associated with a component, such as price, and direct the engineering model process 220 to update its product information based on the detected inconsistency. Additionally, product data manager 240 may detect when a change in an engineering model has been made and ensure that the product information included in product information process 250 is consistent with the change, such as when the price of a component changes based on a change in its design. If there is an inconsistency, product data manager 240 may update the information corresponding to the changed component included in product information process 250.

In addition to the component modeling and configuration processes described above, server system 140 may include a simulation process 260 that performs simulations consistent with certain principles related to the present invention. Simulation process 260 may include processes that interact with configurator process 210 to enable a user located at client system 110 to perform a variety of simulation operations associated with a configured component. Various types of simulation operations that may be performed by methods, systems, and articles of manufacture consistent with certain features of the present invention are described below.

Figure 4:
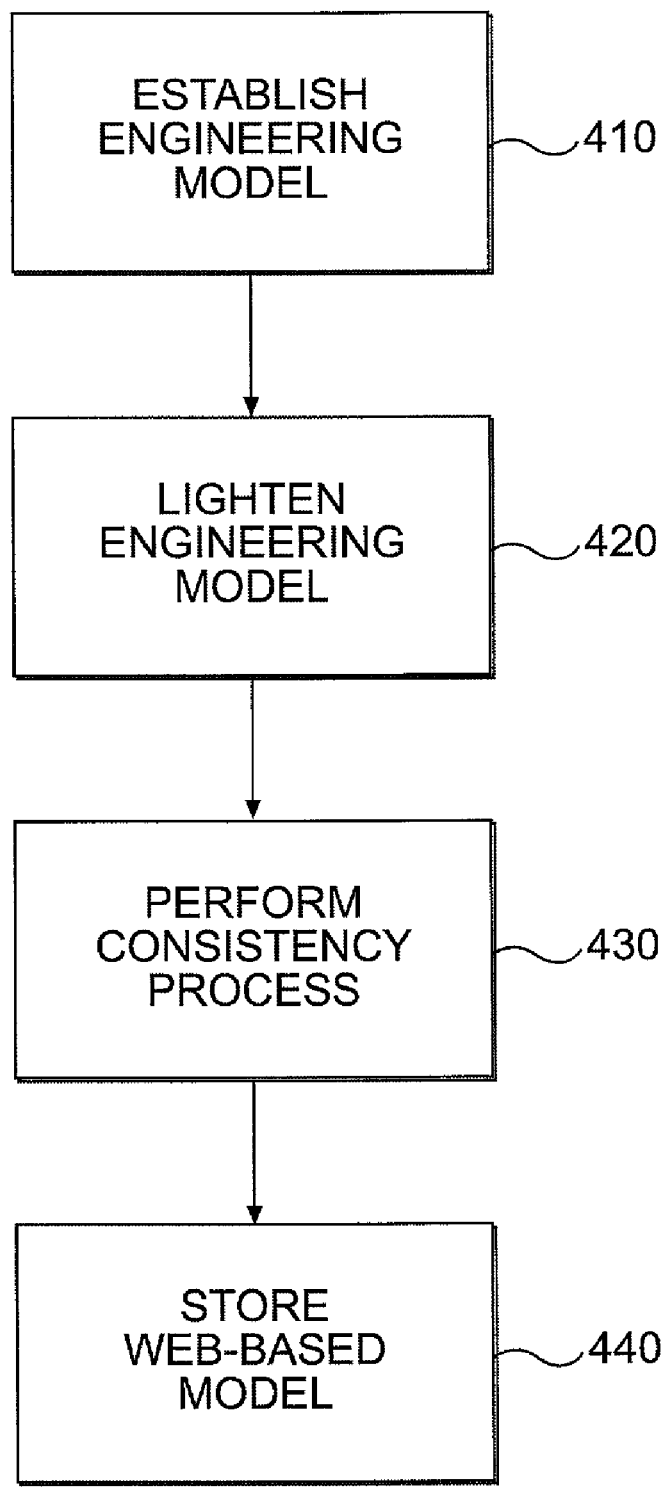
FIG. 4 illustrates a flowchart of an exemplary modeling process consistent with certain principles related to the present invention.

FIG. 4 shows a flowchart of an exemplary modeling process that may be performed by server system 140 consistent with certain features related to the present invention. Although the modeling process is described with reference to a single component, one skilled in the art would realize that the modeling process may be associated with any number of components provided by provider 150. As shown, the modeling process may begin when engineering model process 220 establishes (e.g., accesses and/or creates) an engineering model for a designed component (Step 410). In one aspect of the invention, in creating the engineering model, engineering process 220 may access information managed by product information process 250 and any other source that includes information associated with the component being modeled. Further, engineering model process 220 may store the created engineering model in an appropriate metagroup 310-1 to 310-X shown in FIG. 3.

Once the engineering model is established and stored, model lightening process 230 may lighten the engineering model (Step 420). As previously described, the model lightening process 230 may lighten the engineering model by reducing the weight of a 3D engineering model image through, for example, polygon reduction or any other model reduction process. The reduced model is formed into a web-based model that maintains a reduced amount of engineering data associated with the component, while still allowing configurator process 210 to provide the model as an accurate 3D image of the designed component.

In one aspect of the invention, product data manager 240 may perform a consistency process on the created web-based model to ensure that its characteristics are the same as those associated with its corresponding engineering model (Step 430). For example, product data manager 240 may determine whether the physical dimensions associated with the web-based model are the same as those of its corresponding engineering model. The consistency process may be performed following the creation of the web-based model by model lightening process 230. Alternatively, the consistency process may be performed as a batch process, including a plurality of designed components and their associated web-based models. For example, product data manager 240 may periodically perform a consistency process for one or more lightened models every day, week, or month. If product data manager 240 determines that there is an inconsistency between the web-based model and its corresponding engineering model, it may direct model lightening process 230 to lighten the engineering model another time to produce an updated web-based model. Once the web-based model is verified and/or updated by product data manager 240, the web-based model may be stored in a memory device, such as a database (Step 440).

Figure 5:
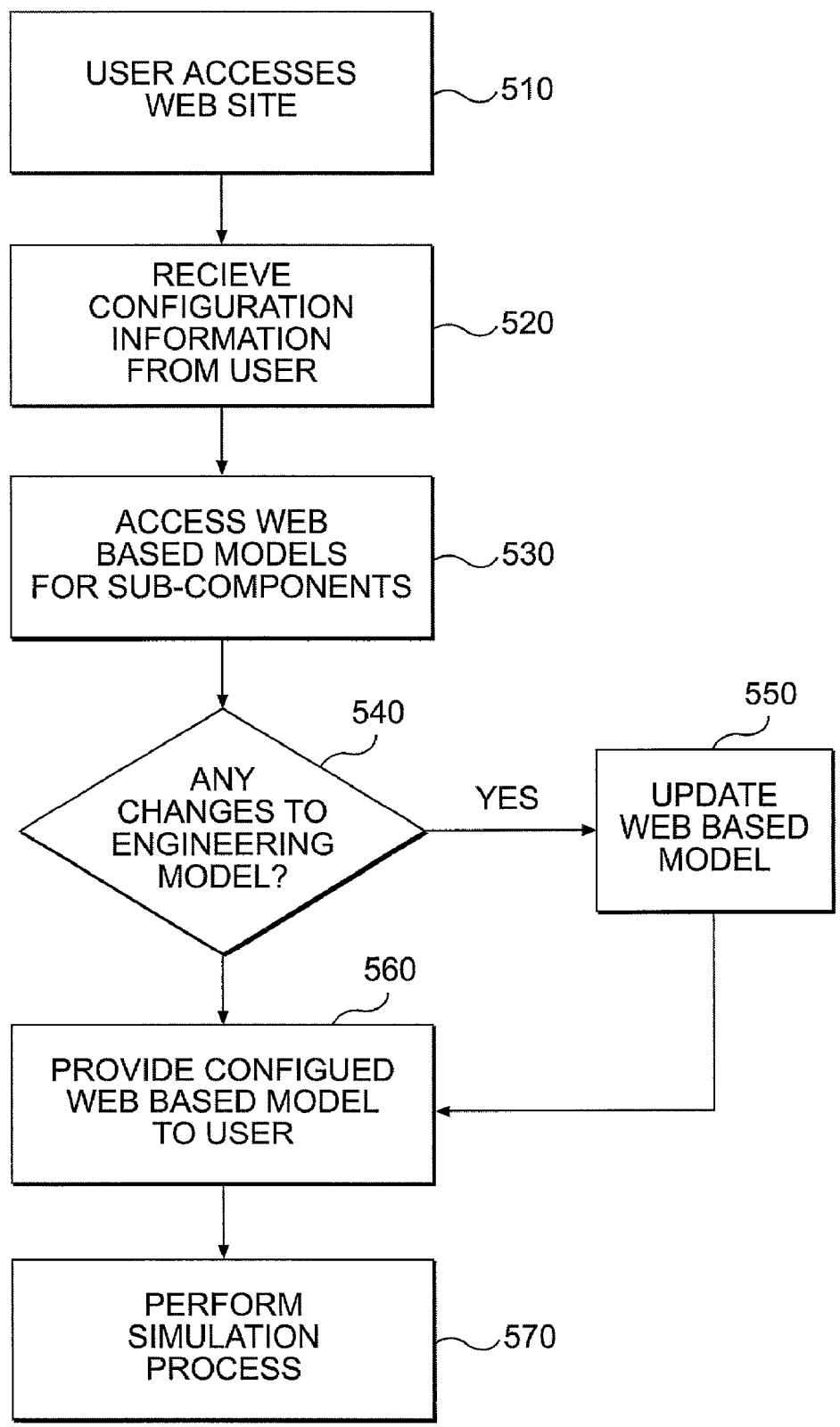
FIG. 5 illustrates a flowchart of an exemplary configuration process consistent with certain principles related to the present invention.

Once stored, the web-based model is available for use by configurator process 210 in manner consistent with certain features related to the present invention. FIG. 5 shows a flowchart of an exemplary configuration process consistent with an aspect of the present invention. As shown, the configuration process may begin when a user located at client system 110 accesses a web site provided by server system 140 (Step 510). The user may access the web site directly from client system 110 and network 130. Alternatively, a user may access the web site through a branded web site provided by a vendor system. Further, the user may access the web site directly from the vendor system. The later example may be associated with a situation where a user contacts a vendor of components (i.e., dealer) offered by provider 150 personally (i.e., the user physically visits a vendor site, such as a dealer) or by other means (i.e., telephonically, via the Internet, etc.). Although the configuration process is described below with reference to a user accessing server system 140 through client system 110 and network 130, one skilled in the art would realize that the user may access server system 140 using a number of different techniques not limited to the examples listed above.

Figure 6:
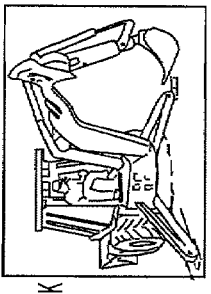
FIG. 6 illustrates an exemplary web page listing of components consistent with certain principles related to the present invention.

In one aspect of the invention, once a user accesses the web site provided by configurator process 210, one or more web pages may be provided and displayed to the user through a browser executing at client system 110. The web page may provide, among other information, a component configuration option that allows a user to configure one or more components offered by provider 150. FIG. 6 shows an exemplary web page that includes a plurality of components (i.e., pieces of equipment) offered by an exemplary provider 150. As shown, the web page may list a plurality of components that the user may select for configuration in a manner consistent with certain features related to the present invention.

Figure 7:
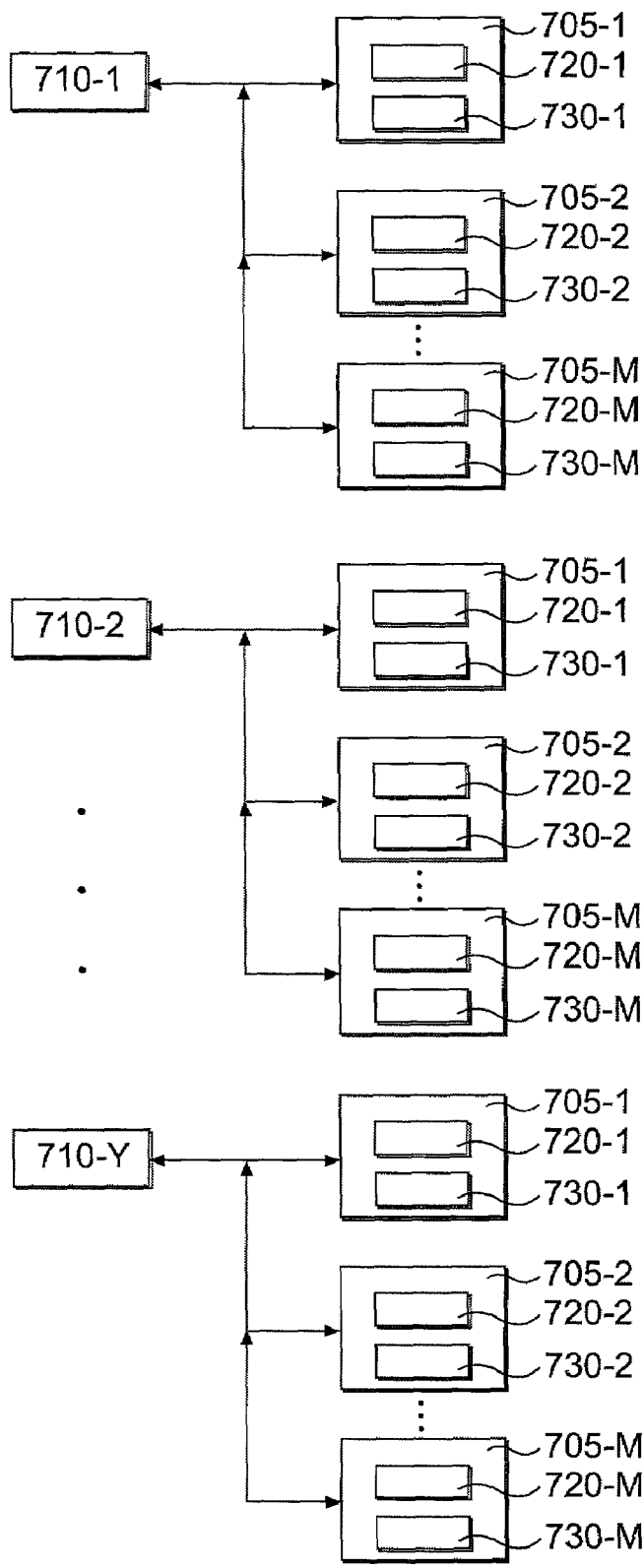
FIG. 7 illustrates an exemplary listing of sub-components consistent with certain principles related to the present invention.

Once configurator process 210 receives a user selection of a component (i.e., backhoe loader), it may access a corresponding web-based model previously created and stored by model lightening process 230. At this point, configurator process 210 may provide the web-based model of the unconfigured component to client system 110 for display to the user. Additionally, or alternatively, configurator process 210 may access a listing of one or more sub-components associated with the selected component. For example, suppose the component selected by the user was a backhoe loader offered by provider 150. In this example, the listing may include various sub-components that be added and/or removed from a base model of the selected backhoe, such as various types of engines, equipment, tires, tracks, etc. Each sub-component included in the list may have a corresponding web-based 3D image model previously created by model lightening process 230. Further, each sub-component may be associated with a collection of product information corresponding to the functional, physical, and marketing characteristics of the sub-component. For each sub-component, the product information may be combined with the 3D image model in a web-based model. Configurator process 210 may collect the web-based models for each sub-component and provide these to client system 110 for display to the user. FIG. 7 shows an exemplary listing of sub-components that may be provided to the user in a manner consistent with one aspect of the present invention.

As shown in FIG. 7, configurator process 210 may provide a set of selections 710-1 to 710-Y that correspond to different types of sub-components that may be included with the selected component. Each selection 710-1 to 710-Y may include one or more options 705-1 to 705-M of various sub-components included in the type of sub-component selection 710-1 to 710-Y. Each option 705-1 to 705-M may include an associated 3D model image 720-1 to 720-M of the respective optional sub-component 705-1 to 705-M. Further, these optional sub-components 705-1 to 705-M may include text based information reflecting characteristic information 730-1 to 730-M associated with the respective optional sub-component. The text based characteristic information may include data associated with physical dimensions, functional aspects, and marketing information (e.g., purchase price) corresponding to the respective optional sub-component 705-1 to 705-M. Further, characteristic information 730-1 to 730-M may not be limited to text-based data, and may include audio and graphical information, hyperlinks, etc., as well. Although FIG. 7 shows each selection 710-1 to 710-Y including M options (705-1 to 705-M), one skilled in the art would realize that each selection 710-1 to 710-Y may include any number of options that may be different from other selections.

In one aspect of the present invention, the user may configure the selected component by selecting an optional sub-component 705-1 to 705-M included in each sub-component type 710 to 710-Y. For example, the user may select optional sub-components 705-1 and 705-2 by using an input device located at client system 110, such as a mouse or keyboard. One skilled in the art would realize that the listing shown in FIG. 7 is exemplary and methods, systems, and articles of manufacture consistent with the present invention may incorporate different formats and types of information when providing the sub-components to the user. For example, configurator process 210 may present a single type of sub-component 710-1 to 710-Y, one at time. When a user selects an optional sub-component 705-1 to 705-M, configurator process 210 may determine the other types of sub-components 710-1 to 710-M, and their corresponding optional sub-components 705-1 to 705-M, that are available for the selected component based on the selected optional sub-component. For instance, a selected optional engine (i.e., sub-component 705-1) configured with a backhoe loader may only be designed to work with a particular size and type of tire. Configurator process 210 may determine this relationship based on data included in each web-based model of the sub-components for the backhoe loader. Accordingly, if the user selects sub-component 705-1, configurator process may only provide those sub-components (i.e., tires) that may be available for the backhoe loader with the selected engine (sub-component 705-1).

Figure 8:
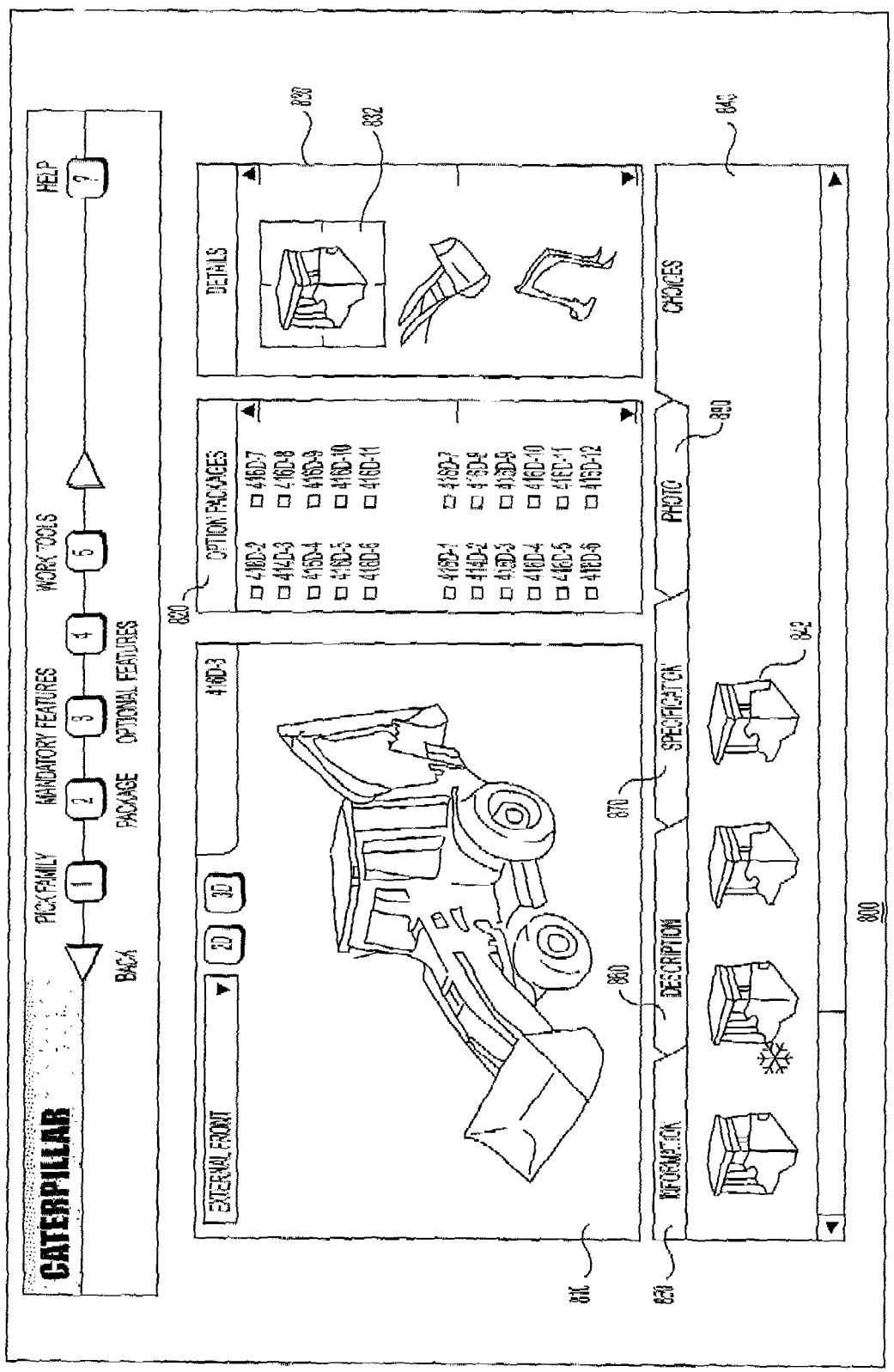
FIG. 8 illustrates an exemplary web page for configuring a component consistent with certain principles related to the present invention.

Methods, systems, and articles of manufacture consistent with certain features related to the present invention may also provide a configuration interface in a web page that is primarily image based. This exemplary format may be useful for providing the configuration process to end users located in different countries with different native languages. FIG. 8 shows an exemplary web page 800 that may be provided by configurator 210 to the user during the configuration process. As shown, web page 800 may include an image model (2D or 3D) of a selected component (e.g., backhoe loader) 810. The web page 800 may also include a text-based listing of options 820 that may be associated with the selected component presented in model 810. Further, the web page 800 may also include a sub-component section 830 that includes one or more image models (2D or 3D) of types of sub-components 832 that are available for configuring the component. Additionally, web page may include a sub-component window 840 that includes image models (2D or 3D) of one or more sub-components 842 of each type of sub-component 832. Additionally, the web page 800 may include other options that may be selected by the user including general information 850, description information 860, specifications of the component and sub-components 870, and photographs 880. One skilled in the art would realize that the format of web page 800 is exemplary and that additional (or less) options, windows, and information may be included without departing form the scope of the present invention. In one aspect of the invention, the user may configure a component, such as model 810, by selecting sub-components 842 using any known input device at client system 110.

Referring back to FIG. 5, once the user has selected one or more sub-components for configuration of the selected component, client system 110 may send the selections to server system 140 through network 130. Configurator process 210 may receive the selections in preparation for configuring a web-based model for the selected component based on the selected sub-components (Step 520). Configurator process 210 may access a web-based model for each selected sub-component to configure a web-based model of the component selected by the user (Step 530). For example, configurator process 210 may configure a web-based model for a backhoe loader with a certain engine, transmission, tire size, other equipment, etc., as selected by the user. The configured web-based model may include a 3D image of the backhoe loader with all of the selected sub-components and any associated text-based characteristic information for each sub-component and the backhoe loader itself.

Figure 9A:
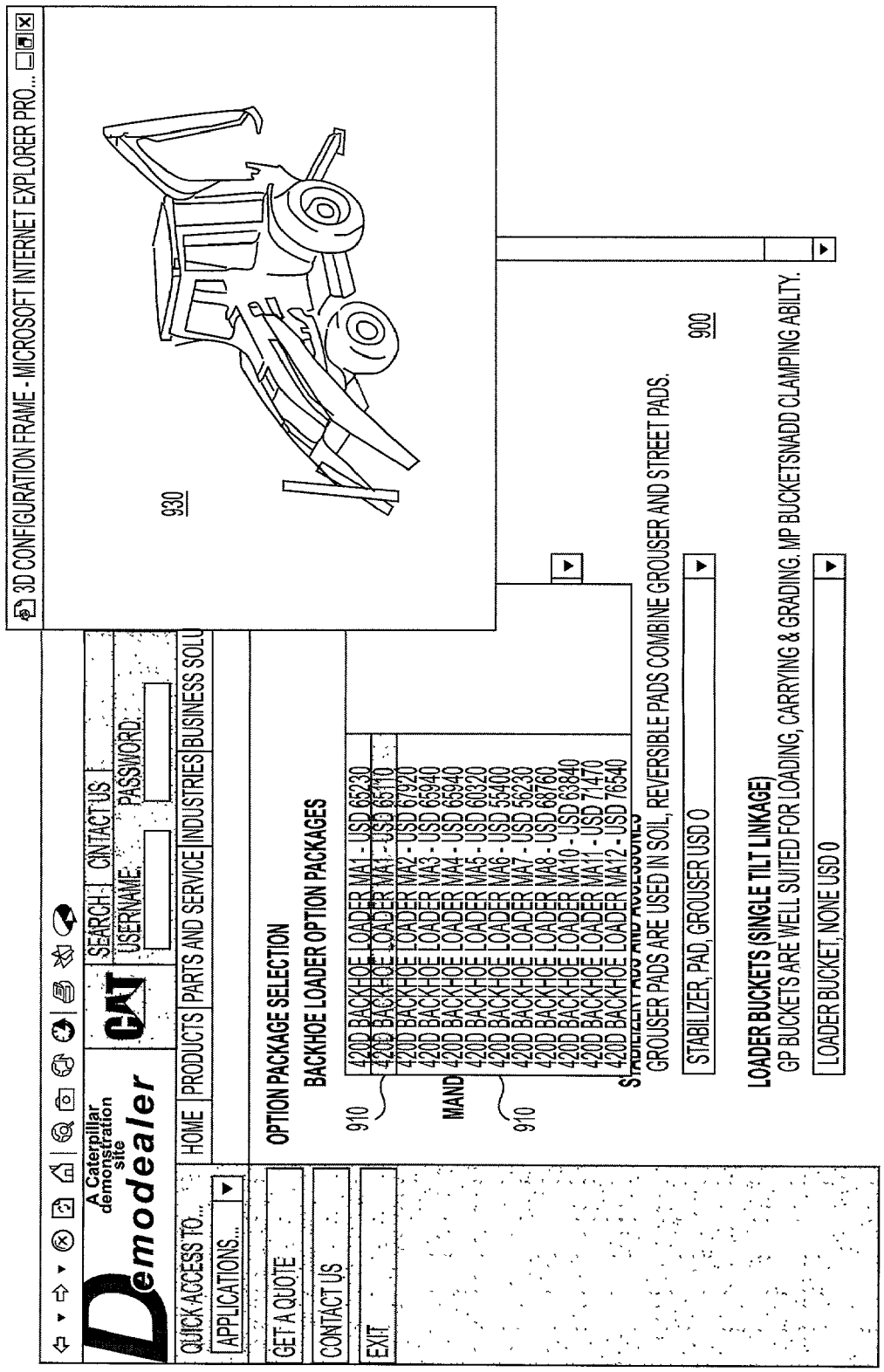
FIGS. 9A–9C illustrate exemplary web pages for configuring a component based on selected sub-components consistent with certain principles related to the present invention.
Figure 9B:
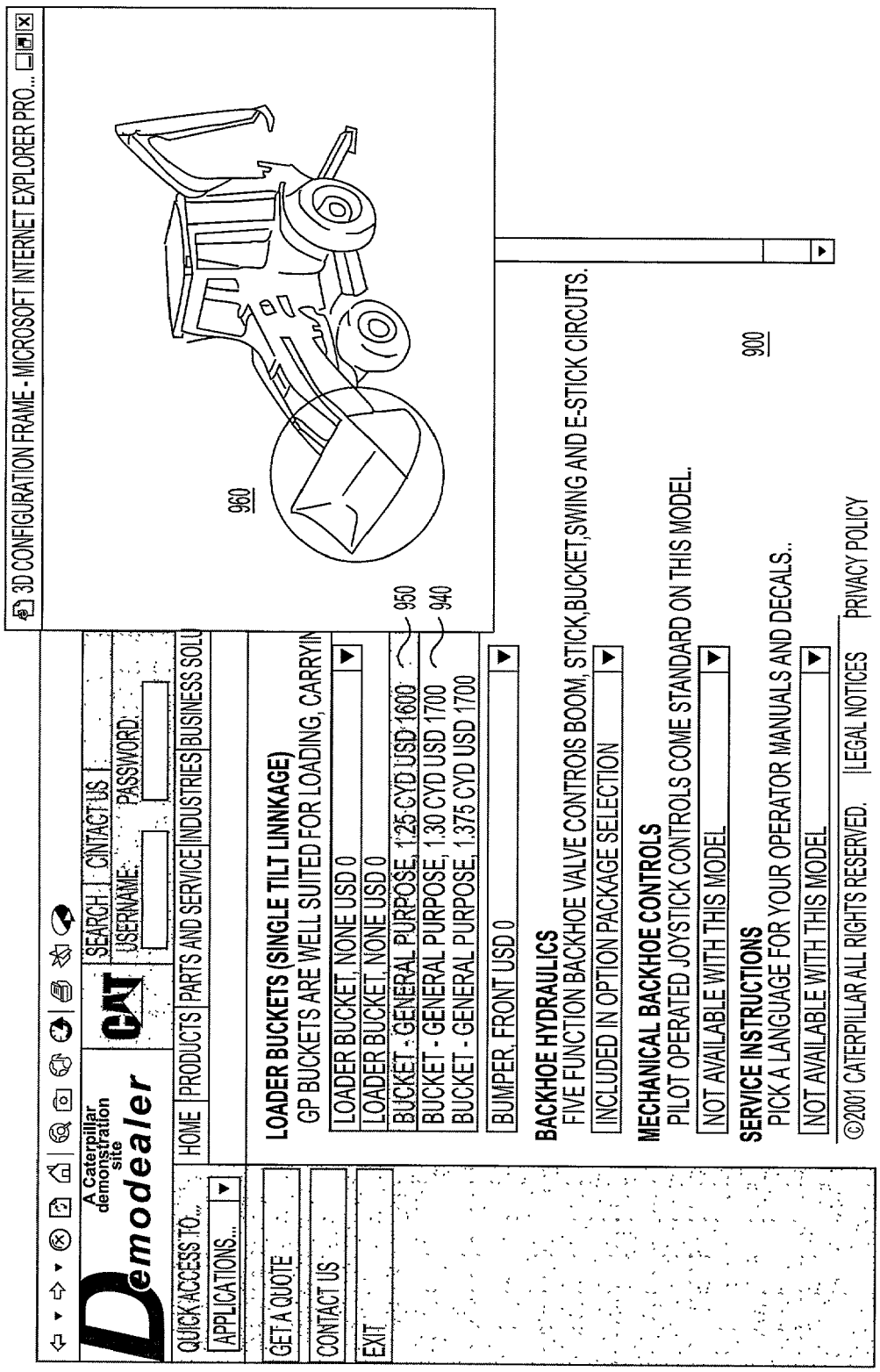
Figure 9C:
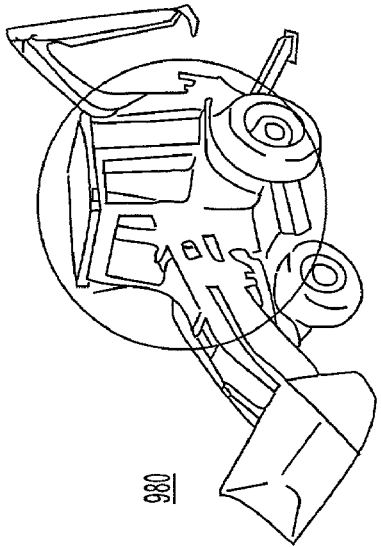

FIGS. 9A–9C show a sequence of exemplary web pages that may be provided to the user based on sub-components selected by the user during the configuration process. As shown in FIG. 9A, once the user has selected a component (e.g., backhoe loader), server system 140 may provide a web page 900 that includes a plurality of options 910 reflecting various models of the types of backhoe loaders offered by provider 150. When the user selects an option (e.g., 920), a web-based model (930) associated with the selected option may be presented in the web page. Additionally, web page 900 may include sub-components that may be offered with the component. FIG. 9B shows exemplary web page 900 including a plurality of sub-components 940 that may be selected by the user for configuring web-based model 930. Once the user selects a sub-component (e.g., 950), the web-based model 930 may be modified by server system 140 to include the a web-based model of the sub-component 970. The user may configure the component 930 by adding or deleting sub-components during the configuration process. As shown in FIG. 9C, the user may replace the selected component 930 with another model 960. Consequently, the web-based model 930 is modified by server system 140 to incorporate the user's selection, and an updated web-based model 980 is provided that includes the component and sub-components selected by the user during the configuration process. Once skilled in the art would realize that web page 900 and its information and images illustrated in FIGS. 9A–9C are exemplary and are not intended to be limiting. A number of different types of images, text, and links may be provided to the user without departing form the scope of the invention.

Referring back to FIG. 5, in one aspect of the invention, prior to, during, or following the configuration of the web-based model of the selected component, configurator process 210 may direct product data manager 240 to perform a consistency process for the web-based models as they are accessed (Step 540). If there has been a design change to an engineering model for a sub-component and/or component (Step 540; YES), product data manager 240 may update the corresponding web-based model by directing model lightening process 230 to lighten the engineering model associated with the redesigned component. The new lightened model may be formed into an updated web-based model corresponding to the changed sub-component. Model lightening process 230 may replace the out-of-date web-based model for the changed sub-component that is stored in the memory with the updated web-based model (Step 550). The updated web-based model for the redesigned component may be provided to configurator process 210.

In the event the component has not been changed (Step 540; NO), configuration process 210 may bypass the updating of the component's web-based model and proceed with configuring the selected component with the selected sub-components.

One skilled in the art would realize that the processes described with respect to steps 540 and 550 are optional and configurator process 210 may skip these processes during the configuration process. For instance, product data manager 240 may be configured to periodically perform a consistency process to verify each web-based model created by model lightening process 230. For instance, product data manager 240 may periodically (i.e., hourly, daily, weekly, etc.) determine whether the engineering models managed by engineering model process 220 have been changed. If changes are detected in an engineering model, its corresponding web-based model may be updated as previously described.

Once configurator process 210 has configured the web-based model for the selected component, it may provide the web-based model to client system 110 for display to the user (Step 560).

In addition to providing an accurate 3D image of the configured component customized by the user, configurator process 210 may also perform a simulation process consistent with certain features of the present invention (Step 570). The simulation process may be associated with a plurality of simulation options that are provided on the web site accessed by the user. For instance, the simulation options may include an ability to operate the configured piece of equipment in a virtual environment selected, or configured, by the user. The virtual environment may include an environment having other machines configured by the user and/or terrain models including load models, etc. Alternatively, a simulation option may allow the user to perform virtual repairs on a 3D image of a configured component during a simulation process. Further, a simulation option may allow the user to train and/or be certified on the operation and/or repair of the configured component during a simulation process. Methods, systems, and articles of manufacture consistent with certain features of the present invention may incorporate and implement a plurality of different types of simulation applications and options that are described below.

Figure 10:
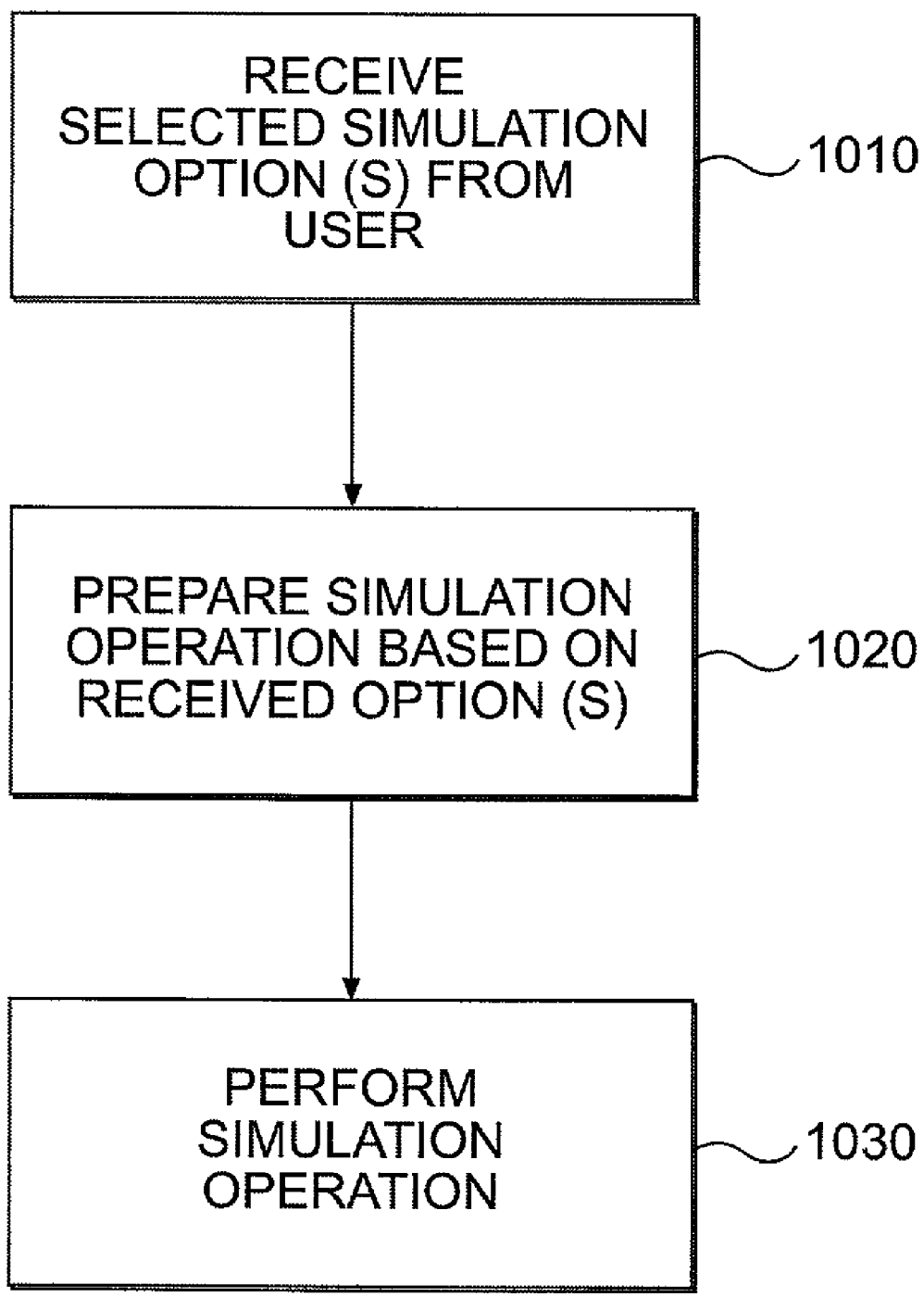
FIG. 10 illustrates a flowchart of an exemplary simulation process consistent with certain principles related to the present invention.

FIG. 10 shows an exemplary simulation process consistent with certain aspects of the present invention. As shown, configurator process 210 may perform a simulation process based on one or more simulation options selected by the user (Step 1010). Based on a simulation option selected by the user, configurator process 210 may direct simulation process 260 to prepare a simulation operation corresponding to the simulation option selected by the user (Step 1020). Once prepared, simulation process 260 and configurator process 210 may collectively perform a simulation operation that is provided to client system 110 for presentation to the user (Step 1030). Alternatively, simulation process 260 may perform and manage the simulation operations alone, and configurator process 210 may perform the transfer of information between client system 110 and simulation process 260. One skilled in the art would realize that a number of different processing and task operation management schemes may be implemented by server system 140 to perform a simulation operation without departing from the scope of the present invention.

Figure 11:
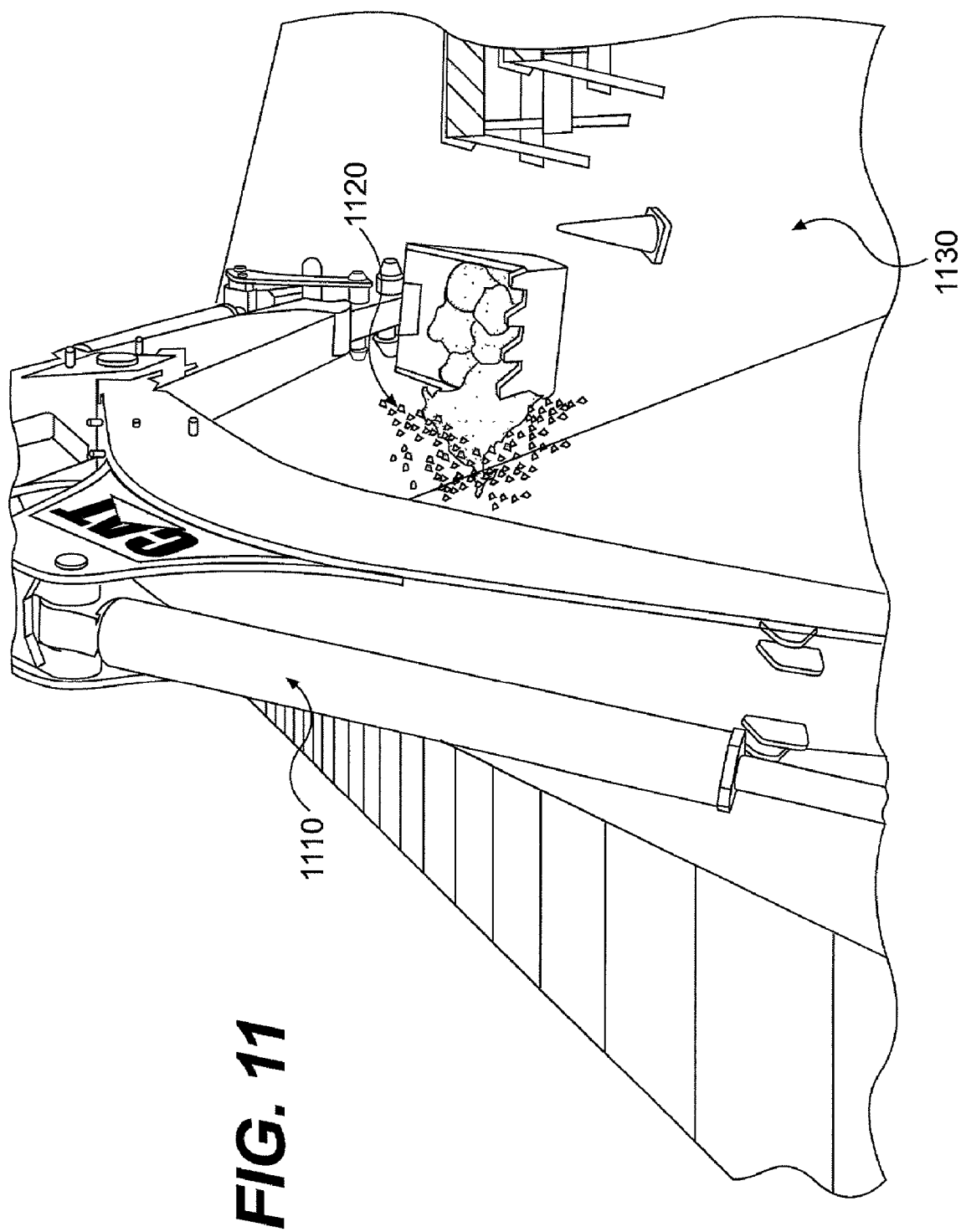
FIG. 11 illustrates an exemplary image of a component in a simulation environment consistent with certain principles related to the present invention.

The simulation operation may be interactive, whereby the user is able to virtually control and manipulate a configured component in a simulation environment. For example, a simulation operation may allow the user to alter views of the configured component and select simulated loads, work environments, ambient weather conditions, surface types, and any other condition under which the configured component may operate. The user may be allowed to select a number of different types of simulation environments in which the configured component may be simulated. The types of simulation environments may be offered to and selected by the user based on the type of component configured by configurator process 210. For example, a configured piece of equipment, such as a dump truck, may be associated with simulation environments including, but not limited to, a mining work environment, a construction site work environment, a farming work environment, and a logging work environment. Alternatively, a configured piece of equipment that is associated with space travel may be simulated in outer-space simulation environments. Further, a configured component associated with underwater operations, such as an underwater support for an off-shore oil rig, may be simulated in various types of underwater work environments. FIG. 11 shows an exemplary image that may be provided to the user during the simulation process for a configured backhoe loader. As shown, the user may select a view that places them in the virtual cockpit of the configured component 1110 where the user may virtually manipulate a configured load 1120 in a simulation environment 1130.

In addition to performing simulation operations, configurator process 210 and simulation process 260 may provide feedback information associated with the simulation operations. Configurator process 210 may provide the feedback information during the execution of a simulation operation or may compile the information for presentation to the user following part or all of the simulation operation. The feedback information may include any type of information associated with the characteristics of the configured component during a simulation operation. For example, the feedback information may include functional characteristics of the configured component during a simulation operation in a simulation environment, such as fuel consumption, revolutions per minute (RPM) of an engine, temperature values, weakened parts of a component or sub-component, and member disfigurement. One skilled in the art would realize that that any type of information that provides a user with dynamic information associated with actual operating characteristics of a web-based model in a simulation environment may be provided by configurator and simulation processes 210, 260 without departing from the scope of the present invention.

INDUSTRIAL APPLICABILITY

The disclosed invention is useful, for example, in providing a user with updated interactive 3D web-based models of a component, such as a piece of equipment, offered by a provider. The web-based models may be lightened versions of engineering models which enable a user to not only configure a component based on image data of sub-components, but also virtually control the configured component in a simulation environment in near real-time. Further, the disclosed invention may also provide the user with dynamic feedback information reflecting actual operating characteristics of the configured component in a selected simulation environment.

In an aspect of the present invention, a server system 140 may provide 3D images of components and sub-components in a web site accessed by a user. The user may select specific sub-components that may be added (or removed) from a base model component, and the server system 140 may provide a web-based 3D model of the configured component showing the sub-components selected by the user. In one embodiment of the invention, if an exact configuration for a component is not available or cannot be processed as requested by the user, server system 140 may provide the user with a recommended configured component that is analogous to the component the user attempted to configure. For example, in the event a particular model for a tool is not available (i.e., not provided by the provider 150), the server system 140 may locate an available previous version of the same tool and incorporate the previous version into the configured component. The server system 140 may provide the user with data indicating that the selected tool was unavailable and that the older version was substituted.

In another aspect of the present invention, the server system 140 may allow a user to virtually control the operation of a configured web-based model of a component. The user may virtually operate the web-based model using any known input device at client system 110, such as a keyboard, joystick, mouse, touchpad, and touchscreens. The virtual operations may include, but are not limited to, driving and/or moving the web-based model, manipulating loads with the configured model, and performing other tasks with the configured model (i.e., pumping liquids, spraying substances, moving articles on a conveyer belt, etc.). The server system 140 may modify the renderings of the web-based model in a display based on the input controls received from the user. Therefore, the user may view the actual response of the web-based model based on their input controls in near real-time. Further, the server system 140 may allow the user to manipulate the web-based model using the input device in order to view the model from various perspectives (i.e., a virtual view from the cockpit of a vehicle, birds-eye view of model, etc.).

In yet another aspect of the present invention, the server system 140 may allow the user to select a simulation environment and simulate operation of the configured component in the selected environment. The simulation environment may be associated with one or more types of work environments, one or more types of loads that the configured web-based model may manipulate, weather conditions, and any other environment and/or conditions that the configured web-based model may be associated with. For example, in the event the web-based model is a piece of equipment, such as a backhoe loader, a configurator process 210 may configure a web site that is provided to the user with simulated work load options. The work load options include loads that have corresponding load and terrain models. These models may include, for example, piles of rocks or soil that may be moved by the configured web-based model. The user may be allowed to configure a terrain or load by selecting work load options provided to client system 110 by server system 140.

For instance, the user may configure and/or select one or more load models that reflect different types of loads that the component may manipulate in a simulation operation, such as different types of gravel, rocks, soil, asphalt, ore, brick, mortar, liquids, etc. Configurator process 210 may allow the user to select the desired type of simulated load and virtually operate the configured piece of equipment to manipulate the simulated load. In addition to 3D images reflecting the simulated operation controlled by the user, the configurator process 210 may also provide to the user feedback information associated with the operating characteristics of the piece of equipment during the simulation operation. For example, configurator process 210 may provide the user with near real-time feedback data associated with functional characteristics of the web-based model as it manipulates the simulated load. The functional data may include, for example, engine characteristics (i.e., RPMs, torque measurements, temperature values, etc.), fuel consumption characteristics, the size of a load as it is manipulated by the model (i.e., tons of dirt that fit into the bed of a tow truck or bucket of a backhoe, etc.), and any other information that may be associated with the operating characteristics of the configured web-based model during its virtual operation with the simulated load. Furthermore, the load models may be manipulated based on selected types of consistencies desired by the user. For example, a load model associated with a type of soil may be modified based on the presence of water introduced into the soil. The consistency associated with the load model may affect the operation of the configured component, such as when a wet load causes the component to tip when a dry load would not. One skilled in the art would realize that a number of different types of characteristics associated with a type of load may be included in a load model and are not limited to the examples described above.

In addition to simulated loads, the server system 140 may also allow a user to select a simulated work environment to operate the configured web-based model. For example, the server system 140 may provide different types of simulated work environments for selection by the user, such as a mining work environment (e.g., the type of mining operation, such as coal, limestone, surface mines, sub-surface mines, etc.), a construction site work environment (e.g., urban, suburban, rural, etc.), a wilderness environment (e.g., a logging site), a farming work environment (e.g., various crop types, water level conditions, terrain conditions, etc.), and any other type of work environment that a web-based model may be expected to operate. Server system 140 may also allow the user to select specific surface and weather conditions that the web-based model may come in contact with during a simulation operation. For example, the user may have the option of selecting models reflecting types of surface soil (e.g., wet, dry, sandy, compacted, loose, soil types etc.) that may affect how the configured web-based model responds during its simulated operation. As with all simulation operations, configurator and simulation processes 210, 260 may provide feedback information associated with the operating characteristics of the configured web-based model during its simulated operation in the selected work environment.

The simulated work environment may include different models associated with types of terrain and loads that may be configured by the user. For example, the user may configure a mine site, a construction site, a farm site, etc. based on selected terrain and load models. Therefore, the user may configure the type of terrain, soil, atmosphere conditions, as well as the grade of the configured terrain and/or soil.

Along with allowing the user to control the operation of the configured web-based model in a selected simulated work environment, the server system 140 may also allow the user to interact the model in a customized global simulated work environment. A global simulated work environment may be associated with a virtual environment in which a plurality of web-based models configured by the user collectively perform a work operation. For example, the user may configure a component, such as a dump truck reflected by a web-based model, and select a type of work operation and environment, such as a mining operation in a particular type of mining environment (e.g., surface mine, type of ore, etc.). Further, the user may designate a certain number of configured components (e.g., dump trucks) to perform the work operation. Accordingly, the server system 140 may create duplicate web-based models of the configured component's web-based model based on the user's designation. That is, the user may request, for example, 100 dump trucks with the same configuration as a dump truck previously configured by the user and server system 140. In response to the user's request, server system 140 may duplicate the web-based model for the configured dump truck 100 times, and prepare the duplicate models for operation in a simulation environment corresponding to the work operation and environment selected by the user.

Once the simulation environment is prepared, the user may be allowed to virtually control one or more of the duplicated models to perform the simulated work operation. Alternatively, the server system 140 may allow the user to select an automated simulation work operation where the user may set up certain goals, work parameters, production values, etc. to be obtained within a certain time frame or by a certain number of configured web-based models. In an automated simulation work operation, the server system 140 may autonomously control the web-based models and perform the simulated work operation based on the goals and parameters set up by the user.

Also, the user may configure different characteristics within a configured global work environment. For example, the user may configure one or more loading machines, one or more transportation machines, as well as configure and designate a dumping and processing region within the global work environment.

In addition to global work environment simulations, the server system 140 may also allow the user to receive feedback information associated with the virtual operation of the configured web-based models within the global work environment. The feedback information may include, but is not limited to, productivity data (i.e., amount of loads moved per hour), operating characteristics associated with individual and/or all of the web-based models during the simulation (e.g., fuel consumption per configured dump truck, engine wear, fluid level changes, etc.), global work operation feedback (e.g., cost of operations, goal achievements/non-achievements, etc.). Further, the feedback information may include estimated production and operation results of the work operation as currently operated in the simulated work environment. Also, the feedback information may include proposed changes to how the web-based model may be manipulated in the work environment to achieve better results, such as higher production values, less operating costs, and suggested flow schemes for optimizing the operations of the configured models. One skilled in the art would realize that the examples listed above regarding the global simulation work environment are exemplary and that server system 140 may provide a number of different types of simulated work operations and feedback data, in various formats without departing from the scope of the invention. For example, the server system 140 may allow a user to configure more than one type of component (e.g., dump truck and a bucket loader/shovel) and operate, or view operation of, the multiple types of configured components in the global simulation work environment.

In one aspect of the invention, the feedback information may include data reflecting how a configured machine operates in relation to an expected performance based on the type of simulation environment exposed to the machine. For example, the feedback information may provide data on whether a configured machine has proper traction based on its exposure to the virtual terrain and/or soil models. Alternatively, or additionally, the feedback information may provide data on whether the configured machine bogs down with higher loads as compared to smaller loads (depending on the type of load and terrain).

As mentioned above, the user may configure a global work environment with various types of machines, such as transportation and loading machines. Based on the types of configured machines, the server system 140 may provide feedback information that reflects performance characteristics associated with the global work environment. For example, the feedback information may include data reflecting whether the loading and transportation machines are sized appropriately for a configured job within the global work environment. This feedback information may include, but is not limited to: (1) how many cycles it may take for a configured machine to fill a configured transportation machine, (2) how well does the transportation and loading machines traverse the configured terrain and/or grades, (2) the fuel economy associated with each machine, (3) predicted wear and tear of the machines, and (4) predicted maintenance that may be needed based on the wear and tear predictions.

Additionally, the feedback information may include project overloading issues associated with the configured global work environment. For example, the feedback information may include data reflecting the efficiency of a processing and/or dumping region and provide estimates corresponding to how many transportation and loading machines of various types may be needed to maintain a desired work flow. Productivity measurements of the global work environment may be used to determine an optimal number of machines that may be needed to achieve a work flow goal designated by the user as well as provide information on service agreements associated with the machines that may be needed to achieve the goal.

In another aspect of the invention, server system 140 may provide an automatic configuration process that enables a user to designate specific job characteristics. In response to these designations, configurator process 210 may configure a recommended component (e.g. machine) or components for the designated job. For example, the user may provide server system 140 with a type of job, a type of application, a type of work condition, a type of material to be manipulated, and type of work environment (e.g., mine site with certain grades and type of soil, etc.). Based on the provided information, the configurator process 210 may determine a recommended machine and/or accessories for the machine that best suit the job designated by the user. The configurator process 210 may establish a web-based model of the recommended machine and provide the model to the user which may or may not be manipulated in a simulation process. The user may also be able to modify the configured machine by adding and/or removing accessories (e.g., sub-components).

In one embodiment consistent with the present invention, the server system 140 may provide the feedback information using a number of different techniques. For example, the feedback information may be provided as text data that is presented on one or more pop-up windows on the web page that includes a displayed simulation operation. Alternatively, the feedback data may be incorporated into the 3D images of the web-based model, such as an RPM gauge displayed in a 3D image of a vehicle. Further, the feedback information may be provided as audio data, such as sound files that are dynamically changed based on the operation of the model during the simulation operation (e.g., engine revolution sounds that increase in pitch as the RPMs of the engine increase). Alternatively, the audio data may be provided in the form of voice data that presents feedback information in any language selected by the user. Also, the feedback information may be provided to the user as a file that may be downloaded to the user's client system 110, a memory device, and/or printed from an output device, such as a printer. Additionally, the user may use a heads-up virtual display system, headset, and/or glasses to receive feedback information as well as perform simulated operations during a simulation process, such as operating a configured machine in a simulation environment.

In addition to allowing a user to select and configure load and/or terrain models based on options provided by server system 140, the present invention may also allow the user to customize a work environment based on end-user data. For example, in one embodiment consistent with the present invention, the user may incorporate a digital picture of an environment, such as a mine site. The digital pictures may be scanned pictures and/or images provided by a digital camera or other similar type of device. One skilled in the art would realize that the source of the digital picture may any type of device that provides digital images without departing from the scope of the invention. In this embodiment, the user may provide the digital picture to server system 140 and the configurator process may allow the user to select and designate an item in the picture. For example, the user may select images of rocks included in a picture and designate the rocks as "gravel." Alternatively, soil may be selected and designated as "clay" or "sand." The configurator process 210 may associate models with the designated item, thus allowing the user to configure realistic simulations of actual environments and manipulate components (e.g., machines, tools, etc.) within the modeled environment. The associated models may be manipulated and re-configured by the user in order to allow specific characteristics to be reflected in the models, such as estimated grades and soil conditions. The characteristics may be dynamically estimated and/or changed to make realistic conditions for configured machines to traverse during a simulation process.

In another aspect of the present invention, server system 140 may allow the user to perform a simulation repair of a configured web-based model. For example, configurator process 210 may allow a user to manipulate a web-based model and 3D virtual tool models to perform a virtual repair of one or more sub-components of the web-based model. That is, server system 140 may allow the user to interact one or more virtual tools with specific dimensions corresponding to the actual size of the tools with the web-based model, as well simulate the assembly and disassembly of components and sub-components. Also, the configurator process 210 may provide feedback to the user reflecting whether a virtual tool will physically fit in a virtual space associated with the component, time tracking data associated with the virtual repair, and any other type of feedback information that may be associated with a repair of the component. The feedback information may be provide by the visualization of the 3D models on a display screen viewed by the user. For instance, a simulation operation facilitating a repair of a component may show the user that a selected virtual tool (and/or sub-component) may not be compatible with the component. Additionally, the server system 140 may provide a "hands off" repair simulation process. This process may allow a user to view a simulation repair operation of a configured component without having to provide input or control to manipulate any web-based models during the simulation process. Accordingly, a user may configure a component in a manner consistent with the present invention, select a type of repair operation, and view the simulated repair operation on a display device. Alternatively, a heads up display, system, headset, and/or glasses may be used by the user to perform the virtual repair.

In addition to visual feedback information during a repair simulation, the present invention may also provide audio based feedback. For example, in one aspect of the invention, audio data may "talk" the user through the steps of performing a simulated repair. Accordingly, trained technicians as well as do-it-yourself type users may utilize the repair simulation aspect of the present invention to learn how to repair a configured component. One skilled in the art would realize that the audio data may be combined with visual image data without departing from the scope of the invention. Additionally, server system 140 may provide a database of information that a user may access to perform selected repairs on a configured component, such as links or files including do-it-yourself repair literature, repair manuals. For instance, links to websites, files, databases, etc., of technical and/or industry based literature, such as woodworking literature, home improvement literature, landscape design, interior design, etc., may be provided by server system 140 for the user to access.

In another embodiment consistent with certain features of the present invention, the server system 140 may provide a virtual coach process. The virtual coach process may help configure a component (e.g., machine) appropriately for the user. For example, if a user attempts to configure a machine in a manner that is incompatible with the machine's design, or in a manner that results in inefficient operation of the machine, the virtual coach process may recommend changes to the configured machine. For instance, if a user attempts to configure a hammer on the back of a backhoe loader and fork on the front, the server system 140 may provide feedback information that the configuration is not recommended as well alternatives to the configuration based on the selected sub-components. Furthermore, the feedback information may include technical and layman reasons why the attempted configuration is not recommended, thus educating the user on the characteristics of the machine.

In one aspect of the invention, the virtual coach process may be used as a training process during a simulation process. For example, as a user manipulates a configured component, such as a backhoe loader, the virtual coach may recommend changes in the manner the machine is being virtually operated. For instance, when certain loads are causing the configured machine to tip, the virtual coach may provide feedback on how the user may manipulate the machine to prevent the tipping, such as repositioning the machine in relation to the terrain and the load, etc. Additionally, if a user is unsure how to operate a configured machine to perform a selected task, the virtual coach process may provide the user with feedback information on the machine's operation. Alternatively, the virtual coach process may step the user through the simulation process by operating the machine to perform a tasks selected by the user. During the simulation process, the virtual coach process may be supplemented with feedback data that explains the operation of the machine during each step of the simulation.

In yet another aspect of the invention, the simulation processes provided by the server system 140 may by used to train and certify a user on the operation, repair, and familiarity of a configured component. This certification simulation process may include feedback information reflecting the performance of the user during the simulation process. For example, a user may be certified on the operation of certain safety equipment on a piece of equipment. In this example, a user may be provided with a simulation environment and configured component. The user may virtually control the operation of the configured component in the simulation environment (e.g., manipulate the component, drive, move loads, etc.) and the server system 140 may provide feedback information reflecting the performance of the user's control of the component. Furthermore, the server system 140 may provide actual certification examinations on-line by allowing the user to operate a configured component and perform a series of controlled tasks. The performance of the user may be scored and based on the score the user may or may not be certified. The certification of the user may be used by a number of different entities, such as rental entities that lease equipment and/or machines. In this example, a rental entity may allow the user to perform a certification simulation process using a selected component, and based on the score associated with the user's performance, the rental entity may or may not allow the user to lease equipment. Alternatively, the certification process may be used to certify a user on the repair of a particular configured component. For example, a web-based model of a particular piece of defective equipment, such as a refrigerator, engine, etc., may be provided such that a user may perform a virtual repair of the equipment through troubleshooting and replacement of sub-components. For instance, the user may manipulate the web-based model to hook up virtual gauges and/or sensors to check for virtual readings of pressure, voltage, currents, etc. The performance of the user during the repair may be scored and the score used to certify the user on the repair of that particular piece of equipment.

In another aspect of the invention, the server system 140 may allow the user to purchase or order a configured component. For example, a user may select an option provided by server system 140 that enables the user to place an order for the component that the user configured. In one aspect of the invention, server system 140 may be configured to provide the user with recommended accessories (sub-components) for the configured component prior to processing the user's order. The recommendations provided by server system 140 may be based on marketing information based on historical sales data, usage data, etc. that may be maintained by server system 140. The user may be allowed to re-configure the configured component with the recommended sub-components and re-place their order.

Variations of the methods and systems consistent with features of the present invention previously described may be implemented without departing from the scope of the invention. One skilled in the art would realize that the applications of methods, systems, and articles of manufacture consistent with certain features related to the present invention are not limited to the examples listed above. The server system 140 may allow a user to configure any type of component and perform simulation processes with the configured component without departing from the scope of the present invention. For example, the server system 140 may allow a user to configure manufacturing equipment (e.g., conveyer belt products), container products (e.g., loading crates for ships), household products (e.g., refrigerators, microwaves, garage door openers, etc.), and industrial products. Furthermore, the present invention maybe applied to the medical industry such that components may be medical equipment that may be manipulated in a simulated medical procedure. Further, the present invention may be applied to landscape architecture such that the components may be associated with plant life (e.g., trees, flowers, etc.) that may be manipulated in a simulated environment. As described, the type of component that may be configured and simulated by server system 140 is not limited to any type of electrical, mechanical, and/or chemical industry. Furthermore, one skilled in the art would realize that all aspects of an environment may be modeled and this modeling concept applied to all types of products and services, such as a compressor in a refrigerator, etc.

Furthermore, methods, systems, and articles of manufacture, consistent with features of the present invention are not limited to the configuration and process sequences described and shown in the figures. For example, the present invention may be implemented using various network and computing models, protocols, and technologies. Also, methods, systems, and articles of manufacture, consistent with features of the present invention are not limited to the implementation of systems and processes compliant with any particular type of programming language. Any number of programming languages may be utilized by the present invention without departing from the scope of the present invention. Also, the present invention is not limited to end users located at vendor and client systems 120, 110. One skilled in the art would realize that other entities may access server system 140, including entities associated with provider 150, to configure and simulate components in a manner consistent with the present invention.

The features, aspects, and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, CD-ROM, mini-CDs, DVDs, a carrier wave from the Internet; or other forms of RAM or ROM. Accordingly, the invention is not limited to the above described aspects of the invention, but instead is defined by the appended claims in light of their full scope of equivalents.

What is claimed is:

1. A method for simulating operation of a machine component, comprising:
    establishing and storing a first original engineering model of a machine component and additional original engineering models for a set of sub-components of the machine component, wherein each of the sub-components is compatible for use with the machine component;
    lightening the first original engineering model to establish a first lightened engineering model and lightening each of the additional original engineering models to establish additional lightened engineering models, the lightened engineering models including less data than their respective original engineering models;
    storing the lightened engineering models at a server system;
    displaying, in a web browser at a client system, a web page including a selection area for selecting the machine component;
    receiving, at the server system, selection data from a user, the selection data selecting the machine component from the web page;
    in response to the selection data:
        displaying the first lightened engineering model in the browser at the client system, thereby establishing a web-based model of the machine component based on the selection data and the first lightened engineering model; and
        presenting a list of the set of additional lightened engineering models in the web browser at the client system as selectable sub-components;
    receiving a selection, from the plurality of additional lightened engineering models in the web browser, of one or more of the sub-components to add to the web-based model;
    adding one or more of the sub-components to the displayed web-based model to create an updated web-based model, and displaying the updated web-based model in the web browser;
    providing, to the user, one or more options reflecting different simulation environments for simulating operation of the web-based model of the configured component;
    receiving a selection from the user reflecting a selected simulation environment; and
    simulating operation of the updated web-based model in the selected simulation environment.

2. The method of claim 1, wherein the first original engineering model includes a 3D image model of the machine component and textual data associated with at least one of physical, functional, and marketing characteristics of the machine component, and wherein lightening the first original engineering model includes removing both image and textual data from the first original engineering model.

3. The method of claim 1 wherein the updated web-based model is a model of a self-propelled mobile machine, and wherein simulating operation includes simulating using the machine to move a load of virtual construction-related objects in the selected environment, and further including:
    providing, to the user, feedback data reflecting the size of the load that fits into the selected model of the machine within the selected environment.

4. The method of claim 1, wherein the selection area for selecting a machine component includes a list of different option packages for the machine, and wherein the selected simulation environment includes a work site environment for the machine to virtually operate within, and further including:
    selecting, by the user, an option package from the selection area and a work site environment from the different simulation environments;
    simulating operation of the selected machine component and its selected option in the selected work site environment; and
    providing, to the user, feedback data reflecting the ability of the selected machine component and its selected option package to operate in the selected work site environment.

5. A system for simulating operation of a machine component, comprising:
    a client system operated by a user; and
    a server system, including:
        a memory for storing a first original engineering model of a machine component and additional original engineering models for a set of sub-components of the machine component, wherein each of the sub-components is compatible for use with the machine component;
        a computer-executed process for lightening the first engineering model to establish a first engineering model and lightening each of the additional original engineering models to establish additional lightened engineering models, the lightened engineering models including less data than their respective original engineering models;
        a memory for storing the lightened engineering models;
        a memory for storing data for generating a web page for display at a client system, the web page including a selection area for selecting the machine component;
        a computer-executed process for receiving selection data from the client system, the selection data indicating the machine component;
        a computer-executed process for, in response to receiving the selection data, including the first lightened engineering model in a web page for the client system, thereby establishing a web-based model of the machine component based on the selection data and the first lightened engineering model;
        a computer-executed process for selecting for display in the web page the additional lightened engineering models as selectable sub-components;
        a computer-executed process for receiving a selection, selected from the additional lightened engineering models in the web page, of one or more of the sub-components to add to the web-based model;
        a computer-executed process for adding one or more of the sub-components to the displayed web-based model to create an updated web-based model, and including the updated web-based model in the web page;

a computer-implemented process for providing, to the client system, one or more options reflecting different simulation environments for simulating operation of the updated web-based model of the machine component;

a process for receiving a selection from the client system reflecting a selected simulation environment;

a process for providing, to the client system, a simulated operation of the updated web-based model in the selected simulation environment; and a processor for executing the processes for lightening, receiving, including, selecting, adding, and providing.

6. The system of claim 5, wherein the updated web-based model is a model of a self-propelled mobile machine, wherein simulating operation includes simulating using the machine to move a load of virtual construction-related objects in the selected environment, and wherein the process for providing includes a process for providing, to the client system, feedback data based on the updated web-based model and the selected simulation environment, the feedback data indicating the size of the load that fits into the selected model of the machine within the selected environment.

7. The system of claim 5, wherein the selection area for selecting a machine component includes a list of different option packages for the machine, and wherein the selected simulation environment includes a work site environment for the machine to virtually operate within, and further including:

a computer-implemented process for receiving a selection, from a client system, of an option package from the selection area and a work site environment from the different simulation environments;

a computer-implemented process for simulating operation of the selected machine component and the selected option in the work site environment; and a computer-implemented process for providing feedback data reflecting the ability of the selected machine component and option package to operate in the selected work site environment.

8. A computer-readable medium including instructions for performing a method, when executed by a processor, for simulating operation of a machine component, the method comprising:

storing at a server system a first original engineering model of a machine component and additional original engineering models for a set of sub-components of the machine component, wherein each of the of sub-components is compatible for use with the machine component;

lightening the first engineering model to establish a first lightened engineering model and lightening each of the additional original engineering models to establish additional lightened engineering models, the lightened engineering models including less data than their respective original engineering models;

storing the lightened engineering models at the server system;

storing, at the server system, data for generating a web page for display at a client system, the web page including a selection area for selecting the machine component;

receiving, at the server system, selection data from a user, the selection data selecting the machine component from the web page;

in response to the selection data:

including the first lightened engineering model in a web page for the client system, thereby establishing a web-based model of the machine component based on the selection data and the first lightened engineering model; and selecting for display in the web page the set of additional lightened engineering models as selectable sub-components;

receiving a selection, selected from the plurality of additional lightened engineering models in the web page, of one or more of the sub-components to add to the web-based model;

adding one or more of the sub-components to the displayed web-based model to create an updated web-based model, and including the updated web-based model in the web page;

providing, to the client system, one or more options reflecting different simulation environments for simulating operation of the updated web-based model;

receiving a selection from the client system reflecting a selected simulation environment; and simulating operation of the updated web-based model in the selected simulation environment.

9. The computer-readable medium of claim 8, wherein the updated web-based model is a model of a self-propelled mobile machine, and wherein simulating operation includes using the machine to move a load of virtual construction-related objects in the selected environment, and further including:

instructions that, when executed by the processor, instruct the server system to provide, to the user, feedback data reflecting the size of the load that fits into the selected model of the machine within the selected environment.

10. The computer-readable medium of claim 8, wherein the selection area for selecting a machine component includes a list of different option packages for the machine, and wherein the selected simulation environment includes a work site environment, and further including:

instructions that, when executed by the processor:

instruct the server system to provide to the client system option package selection data and a work site environment;

simulate operation of the machine component and a selected option package in the work site environment; and provide, to a user, feedback data reflecting the ability of the selected machine component and option package to operate in the selected work site environment.

* * * * *